United States Patent [19]

Sud et al.

[11] Patent Number: 4,811,061
[45] Date of Patent: Mar. 7, 1989

[54] POLYCHROMATIC MUTUAL ALIGNMENT DEVICE FOR AN AIMING APPARATUS

[75] Inventors: Emmanuel Sud, Paris; Jean-Pierre Lelay, Argenteuil; Serge Encaoua, Clichy, all of France

[73] Assignee: Societe d'Applications Generales, Paris, France

[21] Appl. No.: 67,168

[22] Filed: Jun. 29, 1987

[30] Foreign Application Priority Data

Jul. 2, 1986 [FR] France .................. 86 09611

[51] Int. Cl.[4] .................. G01B 11/26; G01C 1/06
[52] U.S. Cl. .................. 356/152; 89/41.05; 89/41.06; 250/342; 356/143; 356/148; 356/153
[58] Field of Search .................. 89/41.05, 41.06; 356/141, 152, 153, 143, 148; 250/342

[56] References Cited

U.S. PATENT DOCUMENTS

| | | | |
|---|---|---|---|
| 4,349,838 | 9/1982 | Daniel | 356/153 |
| 4,385,834 | 5/1983 | Maxwell | 356/153 |
| 4,422,758 | 12/1983 | Godfrey et al. | |
| 4,464,974 | 8/1984 | Goda et al. | |
| 4,668,088 | 5/1987 | Quinque et al. | 356/153 |

FOREIGN PATENT DOCUMENTS 0934218 6/1982 U.S.S.R. .................. 356/153

OTHER PUBLICATIONS

Research Disclosure, No. 188, Dec. 1979, pp. 682–683, No. 18820, Vant., Hants, GB; "Beam-Combining Prism Element".
Radio Engineering and Electronic Physics, vol. 18, No. 7, Jul. 1973, pp. 1097–1100, Washington, U.S.; YU.I. Kolesov et al., "A Study of Beamsplitters for the Far IR".

*Primary Examiner*—Stephen C. Buczinski
*Attorney, Agent, or Firm*—Larson and Taylor

[57] ABSTRACT

A polychromatic mutual alignment device for an aiming apparatus includes an optical mixer having at least two holes each receiving light emitted in one of different spectral ranges for which boresighting is to be achieved and a plate which is transparent in a wave length range and reflective in another wave range for combining the two light beams into a common block output beam. A parabola mirror receives the output beam at an angle with respect to its axis. The mixer and the mirror being so located that all source-forming holes are at the focus of the mirror.

10 Claims, 1 Drawing Sheet

POLYCHROMATIC MUTUAL ALIGNMENT DEVICE FOR AN AIMING APPARATUS

BACKGROUND OF THE INVENTION

1. Field of the Invention

The invention relates to aiming apparatuses having a plurality of units operating in different ranges of the optical spectrum and it is particularly suitable for use in sighting apparatus for weapon systems.

2. Prior Art

Aiming apparatuses are widely used which include a detector sensitive to radiation in the visible range (sighting telescope for visual view or television camera), a detector sensitive to the far infrared (thermal camera), and a laser designator or range finder working in the near infrared. It is necessary to achieve mutual or boresight alignment of the optical paths of the different units. This operation, sometimes termed harmonization, requires a common collimated optical reference emitting in the different sensitive ranges.

A solution which comes immediately to mind consists in using a retractable mirror for directing light emitted by a source-forming hole having a sufficient brightness in the different ranges of the spectrum, when required, to the different detectors. The retractable mirror, depending on its position, directs the light from the source hole to the detectors or clears the field of view thereof. This solution has proved unsatisfactory. It is difficult to provide a source capable of homogeneously illuminating the hole in the different ranges of the spectrum. If a halogen lamp is used whose filament emits in the visible spectrum and whose bulb emits in the infrared spectrum, a dual problem is met with: since the filament and the bulb are at different distances from the source hole, illumination is not homogeneous. Moreover, for numerous applications and particularly on vehicles, the filament is rapidly destroyed by vibrations. It is not possible to adjust the brightness independently for the different spectrum ranges under consideration. Finding a material which is transparent for the whole of the spectrum range to be transmitted and fulfils the field requirements is a problem. A number of other arrangements have been constructed and are described in U.S. Pat. No. 4,422,758 (Godfrey et al.). None is fully satisfactory for use on a vehicle and with detectors working in widely spaced ranges.

SUMMARY OF THE INVENTION

It is an object of the invention to provide an improved boresighting device which is accurate, makes it possible to balance the illumination and the angular diameter of the source in different spectral ranges and overcomes to a large extent the aberration problems.

Briefly, the invention provides a polychromatic mutual alignment device including an optical mixer having at least two holes each receiving light emitted in one of spectral ranges for which boresighting is to be achieved and a plate which is transparent in a wave length range and reflective in another wave range for combining the two light beams into a common block output beam. A parabola mirror is placed so as to receive the output beam at an angle with respect to its axis, the mixer and the mirror being formed so that all source-forming holes are at the focus of the mirror.

Due to the use of a parabola mirror, spherical aberration is removed and a well-collimated beam may be obtained. A mirror reflecting in the range from the visible spectrum to the far infrared may be manufactured without difficulty.

In a preferred embodiment, the mixer includes a first block of a material opaque to the far infrared, formed with two perpendicular straight passages aligned with the holes, the plate being at the intersection of the two passages so as to transmit the light from that one of the holes which forms the source in the far infrared and for reflecting the other light beam.

With this arrangement, the far infrared light traverses the plate only in a zone where the plate is not bonded. Since light travels freely along a passage, chromatism is considerably reduced and the problem of absorption by bonding agents in the far infrared is eliminated while rigidity is ensured by the block.

When, as will be the most frequent case, the device is for mutual alignment in three frequency ranges including far infrared, visible light and near infrared, the optical mixer will include a second block applied to the first one, formed by a mixer cube made of a material which is transparent in the visible and in the near infrared, having two source holes formed on two mutually orthogonal surfaces and having a dichroic plate combining the light beams from the two source holes into a beam aligned with the second passage of the first block.

The invention also provides an aiming apparatus including a mutual alignment or boresight device as defined above, operatively associated with controllable means for optionally sending the output beam to the detector units of the apparatus or for freeing the field of view thereof.

The invention will be better understood from the following description of a particular embodiment given by way of example. The description refers to the accompanying drawings.

DETAILED DESCRIPTION OF A PREFERRED EMBODIMENT

Figure 1:
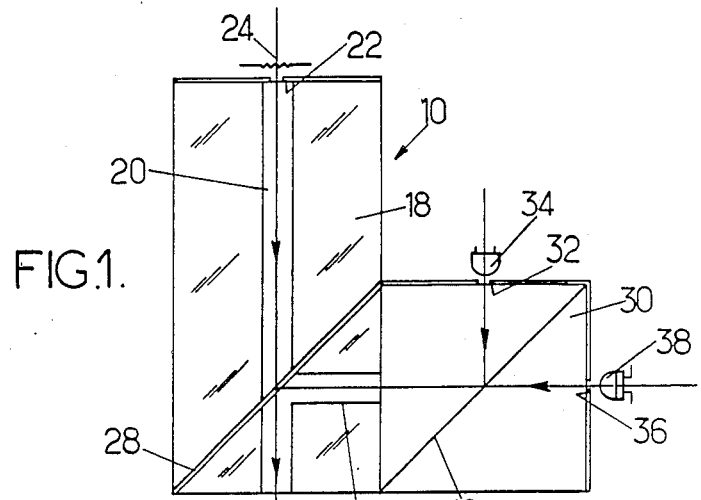
FIG. 1 is a schematic view of a polychromatic boresighting device, in section through a plane passing through the axis of the different light beams.

FIG. 1 shows a device for aligning three channels and, for that reason, delivering a single collimated beam having spectral components in three different wavelength ranges, e.g.:

8 to 12 $\mu$m (far infrared)

0.65 $\mu$m (visible light)

0.93 $\mu$m (near infrared).

The device includes an optical mixer 10 and a parabola mirror 12 which receives the output beam from mixer 10, through a fold mirror 14 in the illustrated embodiment. The purpose of the parabola reflector is to change the divergent beam which it receives into a parallel collimated output beam 16. To avoid the shadow effect of mirror 14, the light beam falls on mirror 12 with a slight angle of incidence with respect to the mirror axis. Mirrors 12 and 14 have a surface coating selected to render them reflective in the whole spectrum of the beam received and reflected.

The optical mixer 10 includes a first block 18 formed with the first linear passage 20 through which passes the light emitted by a source-forming hole 2, illuminated with light having appreciable energy in the far infrared. Illumination of the hole may be by a filament 24 of a noble metal, heated by an electric current. A platinum-rhodium alloy may be used or an alloy for resistors operating at high temperatures, such as "ALFERON" which may work at a temperature as high as 1100° C.

A second passage 26, orthogonal to the first passage, is formed through block 18 for a light beam from sources in the visible and near infrared spectra. The light beams are mixed by a thin plate 28, transparent in the infrared range from 8 to 12 μm and reflecting in the near infrared and visible ranges. Suitable materials for plate 28 are zinc selenide and sulphide. Plate 28 is placed between two sections of block 18 and bonded to these sections. Since there is no bonding agent within passage 20, there is no need to find a bonding agent having good adhesive qualities and transparent in the whole spectrum. Furthermore, it is not necessary to construct block 18, and more particularly the fraction of this block through which the beam leaves, from a material which is transparent for the whole spectrum.

Mixer 10 includes a second block 30 for directing a beam containing visible light and infrared light into passage 26. That visible light is delivered by a source 32, formed for example by an opening in an opaque coating, illuminated by light emitting diode 34 emitting red light. Infrared light may be delivered by a source 36, also formed by a hole in a coating, illuminated by a LED 38 emitting in the near infrared. It is of advantage to use LEDs for they are substantially monochromatic and that avoids the problems of chromatism. Moreover, light emitting diodes are available which have a sufficiently large emissive surface so as to cover the area of source holes 32 end 36 of appropriate dimensions. LED 34 may be a diode of type HLMP 3750 (Hewlet Packard) which has an emission peak at 640 nm. LED 38 may be of type TIES 16A (Texas Instrument) emitting at 930 nm. Such LEDs and a filament 24 made from a noble metal have satisfactory mechanical strength, even in a very wide heat range (−30° C. to +70° C.) and a vibratory environment.

The second block 30 may be solid, for there exist numerous optical materials having sufficient transparency in the visible and near infrared spectra. Quartz may typically be used. The light fluxes emitted by the source holes 32 and 36 is mixed by a dichroic plate 40, transparent for the spectral emission of diode 38 and reflecting in the visible spectrum. This dichroic plate 40 consists of a coating deposited on one of the sections forming block 30 (typically by depositing interferential layers). The two sections of block 30 may then be bonded together, since adhesives are available which are transparent in the visible light range.

The sizes of blocks 18 and 30 must be such that the optical paths from each of the source holes 22, 32 and 36 to the parabola mirror 16 are equal to the focal distance of the mirror.

Figure 2:
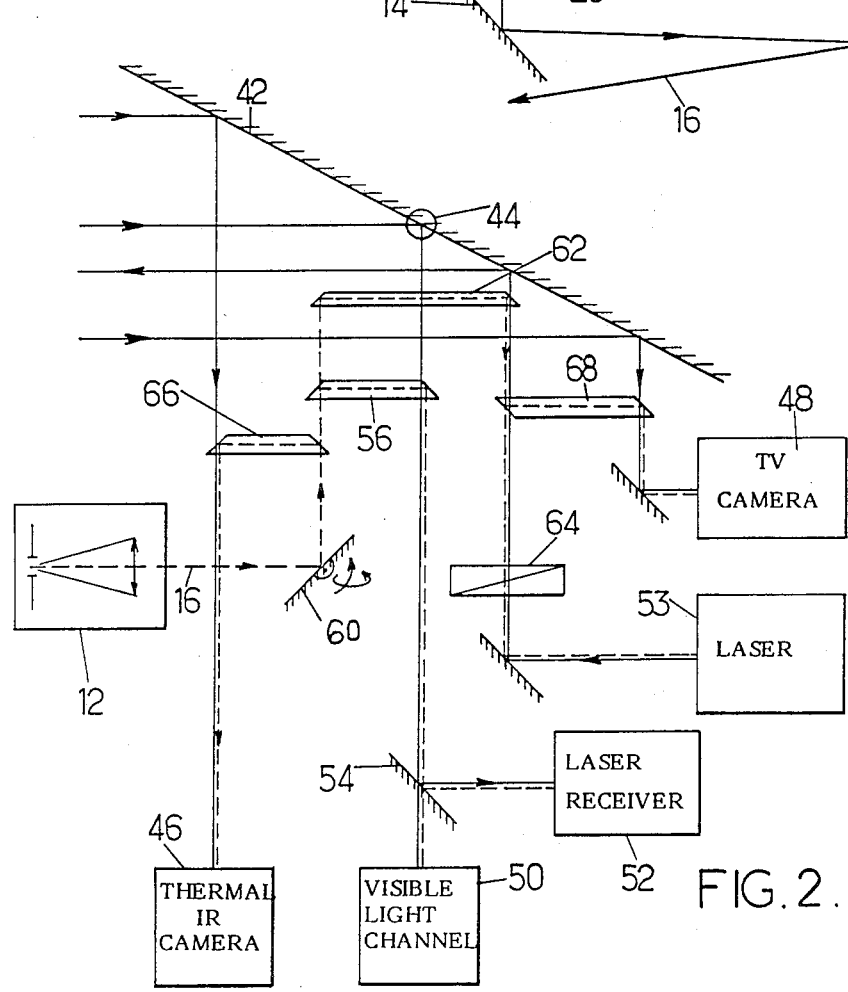
FIG. 2 is a general diagram showing a possible arrangement of the different elements of a sighting apparatus including a device such as shown in FIG. 1, however without any attempt to represent the components at the same scale, for more clarity.

The device which has just been described may be embodied in a stabilized aiming apparatus having the components shown in FIG. 2. The construction and relative assembly of the different components will not be described in detail for quite different shapes may be used. Reference may be had to numerous documents for a description of sighting apparatus to which the invention is applicable, including prior patents granted to the assignee of the present invention.

Referring to FIG. 2, a sighting apparatus includes an aiming and stabilizing mirror 42 rotatable by motor means (not shown) about an axis 44 and:
- a thermal infrared camera 46, sensitive in the range from 8 to 12 μm,
- a television camera 48 using a linear array or a matrix of charge transfer elements or CCD, sensitive in the range from 0.45 to 1 μm,
- a direct visual observation path having a telescope 50,
- a laser range finder 52, 53 often operating at 1.06 μm and whose receiver 52 is harmonized with the optical channel during construction, the paths of the two channels being common up to a dichroic splitter plate 54.

The mutual alignment device 12 must allow harmonization of visual observation channel 50 with the boresights of the thermal infrared camera 46 and the CCD camera 48 with accuracies corresponding to the size of the pixel in the respective cameras.

For that, cube corner prisms 56 and 58 having two positions are provided. In the position where it is shown in FIG. 2, the prism 56 sends the collimated beam within an angular range of a few degrees towards the visible channel 50 and the laser receiver 52. The collimated beam may be aligned with the aim-reticle of the telescope:
- either manually, by rotating a mirror 60 about two mutually orthogonal axes, as indicated with arrows;
- or automatically, from error signals delivered by a four-quadrant light sensitive cell (not shown) placed symmetrically to the reticle and which control a servoloop controlling mirror 60.

The laser beam is then harmonized. The prism 56 is retracted and a second cube corner prism 62 is moved into the position where it is illustrated in FIG. 2. Harmonization may again be carried out automatically or manually. In the first case, a four quadrant cell (not shown) may be provided whose center is on a line perpendicular to the axis of the laser telemeter and a servo-control circuit controlling the two prism-type optical wedges constituting an alignment diasporameter 64 until the collimated beam and the center of the cell are aligned.

Harmonization of the thermal camera 46 may then be carried out, after the cube corner 66 has been moved to the position where it is illustrated. The electronics associated with infrared camera 46 then determine the position of the barycenter of the spot formed by the beam on the screen of the camera and overlays, on the thermal infrared image display screen, a reticle which defines the thermal infrared boresight.

Finally, the CCD camera 48 may be harmonized using the corner 62 and the folding prism 68, in the same way as camera 46.

For easier understanding, the paths of light during normal operation of the system have been indicated in full lines in FIG. 2 while the various light paths from the alignment device during mutual alignment are indicated in broken lines.

We claim:
1. Polychromatic mutual alignment device for boresighting a plurality of units of an aiming apparatus operating in different ranges of the optical spectrum, including:

an optical mixer for combining separated beams of light of different wavelength into a common output beam, said optical mixer having at least two separate holes, source means for illuminating the two holes with light in two different spectral ranges, a beam combining plate which is transparent in one of said different spectral ranges and is reflective in other one of said spectral ranges, located to receive light from said two holes and to combine them into said common output beam, and a parabola mirror placed to receive said output beam at an acute angle with respect to the axis of said mirror, the optical mixer and the mirror being arranged and sized so that all holes are at a distance from said parabola mirror equal to the focal length of the latter.

2. Alignment device according to claim 1, wherein the optical mixer includes a first block of a material which is opaque to far infrared light and is formed with two mutually perpendicular straight passages aligned with respective ones of the holes, said plate being at the intersection of the two passages so as to transmit light from one of said two holes which is illuminated in the far infrared, received along one of said passages, and for reflecting light from the other of the holes received along the second one of said passages.

3. Alignment device according to claim 2, wherein said optical mixer further includes a second block comprising a beam combining cube of a material which is transparent to visible and the near infrared light, having said other of said two separate holes formed on a first surface of said cube and an additional light source hole formed on a second surface of said cube orthogonal to said first surface and having a dichroic plate receiving the light beams from said other of said two separate holes and from said additional light source hole and combining them into a beam aligned with the second passage of the first block.

4. Alignment device according to claim 3, wherein said second block is solid and consists of two corner parts separated by said dichroic plate which is transparent in one of visible and near infrared spectrum and reflective in the other one of said near infrared and visible light spectrum.

5. Alignment device according to claim 3, wherein the two sources of said second block consist of openings in an opaque coating of said second block which receive light in the visible range and in the near infrared respectively from respective light emitting diodes having an emission surface corresponding to the whole of said openings.

6. Alignment device according to claim 2, wherein said beam combining plate is of a material which transmits far infrared and reflects near infrared and visible light and is clamped between two separate parts of said first block and bonded to said parts around said passages.

7. Alignment device according to claim 6, wherein said beam combining plate is of zinc selenide or zinc sulphide.

8. Alignment device according to claim 1, wherein one of said holes confronts an electrically heated filament for emission in the far infrared range.

9. Alignment device according to claim 4, wherein said dichroic plate consists of a coating on one of the two corner parts constituting the second block.

10. In a sighting apparatus comprising a plurality of units including at least one visual viewing unit having a reticle and a TV camera unit operating in a wavelength range different from visible light, a polychromatic mutual alignment device for boresighting said plurality of units operating in different ranges, including:

an optical mixer for combining separated beams of light of different wavelength into a common output beam, said optical mixer having at least two separate holes, source means for illuminating the two holes with light in different spectral ranges, a beam combining plate which is transparent in one of said spectral ranges and is reflective in other one of said spectral ranges, located to receive light from said two holes and to combine them into said common output beam, and a parabola mirror placed to receive said output beam at an acute angle with respect to the axis of said mirror, the optical mixer and the mirror being arranged and sized so that all holes are at a distance from said parabola mirror equal to the focal length of the latter and further including an aiming mirror for adjusting the common output from said device on the reticle of said visual observation unit and means for detecting the image of the adjusted beam formed on the TV camera.

* * * * *

UNITED STATES PATENT AND TRADEMARK OFFICE
CERTIFICATE OF CORRECTION

PATENT NO. : 4,811,061
DATED : March 7, 1989
INVENTOR(S) : SUD, ET AL.

It is certified that error appears in the above—identified patent and that said Letters Patent is hereby corrected as shown below:

The name of the assignee in item [73] of the title page is corrected to read as follows:

[73] SOCIETE D'APPLICATIONS GENERALES D'ELECTRICITE ET DE MECANIQUE SAGEM, Paris, France Signed and Sealed this Third Day of April, 1990

*Attest:*

HARRY F. MANBECK, JR.

*Attesting Officer*   *Commissioner of Patents and Trademarks*